(12) United States Patent
Ryf et al.

(10) Patent No.: US 9,362,708 B2
(45) Date of Patent: Jun. 7, 2016

(54) COMPACT TWO-STAGE OPTICAL AMPLIFIER

(71) Applicant: ALCATEL-LUCENT USA, INC., Murray Hill, NJ (US)

(72) Inventors: Roland Ryf, Aberdeen, NJ (US);
Nicolas K. Fontaine, Keyport, NJ (US);
David Neilson, Old Bridge, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 201 days.

(21) Appl. No.: 14/032,634

(22) Filed: Sep. 20, 2013

(65) Prior Publication Data

US 2015/0086199 A1    Mar. 26, 2015

(51) Int. Cl.
| H04B 10/00 | (2013.01) |
| H01S 3/067 | (2006.01) |
| H04B 10/25 | (2013.01) |
| H04B 10/564 | (2013.01) |
| H01S 3/23 | (2006.01) |

(52) U.S. Cl.
CPC ......... *H01S 3/06754* (2013.01); *H01S 3/06737* (2013.01); *H01S 3/2333* (2013.01); *H04B 10/25* (2013.01); *H04B 10/564* (2013.01); *H04B 2210/00* (2013.01)

(58) Field of Classification Search
CPC .............................. H04B 10/564; H04B 10/25
See application file for complete search history.

(56) References Cited

U.S. PATENT DOCUMENTS

| 5,703,987 | A * | 12/1997 | Imoto | C03B 7/01222 385/123 |
| 6,055,092 | A * | 4/2000 | Sugaya | H01S 3/06754 359/337 |
| 6,104,528 | A * | 8/2000 | Hwang | H01S 3/10023 359/337.11 |
| 6,122,096 | A * | 9/2000 | Fatehi | G02B 6/2932 359/337.21 |
| 6,342,965 | B1 * | 1/2002 | Kinoshita | H01S 3/06725 359/334 |
| 6,636,657 | B1 * | 10/2003 | Aksyuk | G02B 6/12019 385/140 |
| 8,773,755 | B2 * | 7/2014 | Nishihara | H01S 3/06737 359/341.1 |
| 2002/0176659 | A1 * | 11/2002 | Lei | G02B 6/29358 385/24 |
| 2002/0176677 | A1 * | 11/2002 | Kumar | C03B 7/01222 385/126 |

(Continued)

*Primary Examiner* — Danny Leung
(74) *Attorney, Agent, or Firm* — Kramer & Amado, P.C.

(57) ABSTRACT

Various exemplary embodiments relate to an optical amplifier, including: a multicore rare-earth doped optical fiber with a first plurality of cores associated with a first stage of the optical amplifier and a second plurality of cores associated with a second stage of the optical amplifier; a three dimensional (3D) waveguide configured to couple input space division multiplexed (SDM) channels into the first plurality of cores at a first end of the multicore rare-earth doped optical fiber and to couple channels from the second plurality of cores to output SDM channels; a reflector configured to optically interconnect the first plurality of cores to the second plurality of cores; and pump laser coupled to the multicore rare-earth doped optical fiber configured to produce laser pump light to pump the multicore rare-earth doped optical fiber.

15 Claims, 3 Drawing Sheets

(56) References Cited

U.S. PATENT DOCUMENTS

| | | | |
|---|---|---|---|
| 2003/0007202 A1* | 1/2003 | Moser | G02B 6/2931 359/15 |
| 2003/0021526 A1* | 1/2003 | Bouevitch | G02B 6/2713 385/24 |
| 2003/0095777 A1* | 5/2003 | Janssen | G02B 6/266 385/140 |
| 2007/0160321 A1* | 7/2007 | Wu | G02B 6/12021 385/24 |
| 2011/0243517 A1* | 10/2011 | Kokubun | G02B 6/02042 385/123 |
| 2013/0136404 A1* | 5/2013 | Feuer | G02B 6/02042 385/124 |
| 2014/0055843 A1* | 2/2014 | Roland | H01S 3/06754 359/341.3 |
| 2014/0231647 A1* | 8/2014 | Chinn | G01S 17/10 250/338.4 |
| 2015/0049379 A1* | 2/2015 | Doerr | G02B 6/30 359/334 |
| 2015/0085352 A1* | 3/2015 | Ryf | H01S 3/06754 359/341.33 |
| 2015/0086199 A1* | 3/2015 | Ryf | H01S 3/06754 398/43 |

* cited by examiner

COMPACT TWO-STAGE OPTICAL AMPLIFIER

CROSS-REFERENCE TO RELATED APPLICATIONS

This application hereby incorporates by reference, in its entirety, U.S. application Ser. No. 14/032,299, "OPTICAL AMPLIFIER FOR SPACE-DIVISION MULTIPLEXING", which is being concurrently filed on Sep. 20, 2013, by Roland Ryf, Nicolas K. Fontaine, Rene' Jean Essiambre, and David Neilson.

TECHNICAL FIELD

Various exemplary embodiments disclosed herein relate generally to optical amplifiers and methods and apparatus that use an optical amplifier.

BACKGROUND

In many optical communication systems, the data-modulated optical carrier undergoes amplification between the optical transmitter and the optical receiver. One type of optical amplification involves conversion of a data-modulated optical carrier from an optical signal to an electrical signal and a re-conversion of a corresponding electrical back to an optical signal. Such a conversion and re-conversion sequence is typically referred to as optical to electrical to optical (OEO) type of signal processing. Another type of optical amplification involves amplification of the data-modulated optical carrier in the optical domain without any type of OEO signal procession. This later type of optical amplification is often referred to as all-optical amplification. All-optical amplification has been performed using laser pumping of a fiber doped with rare-earth dopant atoms.

In long-distance optical communication systems, OEO and/or all-optical amplification is often needed to compensate for attenuation of the data-modulated optical carrier in passive optical transmission fibers.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to an optical amplifier, including: a multicore rare-earth doped optical fiber with a first plurality of cores associated with a first stage of the optical amplifier and a second plurality of cores associated with a second stage of the optical amplifier; a three dimensional (3D) waveguide configured to couple input space division multiplexed (SDM) channels into the first plurality of cores at a first end of the multicore rare-earth doped optical fiber and to couple channels from the second plurality of cores to output SDM channels; a reflector configured to optically interconnect the first plurality of cores to the second plurality of cores; and pump laser coupled to the multicore rare-earth doped optical fiber configured to produce laser pump light to pump the multicore rare-earth doped optical fiber.

Various exemplary embodiments relate to a method of amplifying space division multiplexed (SDM) optical channels, including: receiving a plurality of SDM optical channels; coupling the plurality of SDM optical channels into a first plurality of cores of in a multicore rare-earth doped optical fiber at a first end of the multicore rare-earth doped optical fiber; pumping laser light into the multicore rare-earth doped optical fiber; coupling the SDM optical channels in the first plurality of cores into a second plurality of cores in the doped multicore fiber at a second end of the multicore rare-earth doped optical fiber; coupling the plurality of SDM optical channels from the second plurality of cores in multicore rare-earth doped optical fiber at the first end; and outputting the coupled plurality of SDM optical channels from the second plurality of cores.

BRIEF DESCRIPTION OF THE DRAWINGS

In order to better understand various exemplary embodiments, reference is made to the accompanying drawings, wherein.

Figure 1:
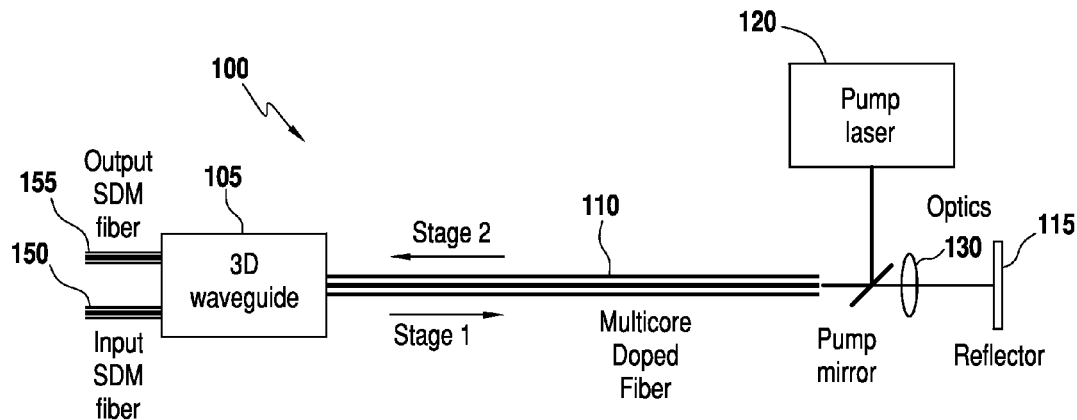
FIG. 1 illustrates an embodiment of a two-stage optical amplifier using a multicore rare-earth doped optical amplifier fiber.

In the Figures, relative dimensions of some features may be exaggerated to more clearly show one or more of the structures being illustrated therein. To facilitate understanding, identical reference numerals have been used in the Figures and the text to designate elements having substantially the same or similar structure or substantially the same or similar function.

Herein, various embodiments are described more fully by the Figures and the Detailed Description. Nevertheless, the inventions may be embodied in various forms and are not limited to the specific embodiments that are described in the Figures and Detailed Description.

DETAILED DESCRIPTION

The description and drawings merely illustrate the principles of various ones of the inventions. It will thus be appreciated that those skilled in the art will be able to devise various arrangements that, although not explicitly described or shown herein, embody the principles of the inventions and are included within its scope. Furthermore, all examples recited herein are principally intended expressly to be only for pedagogical purposes to aid the reader in understanding the principles of the inventions and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

As the volume of network traffic increases in optical communication networks, the throughput limits of optical fibers are being reached. Wavelength division multiplexing (WDM) has been used to increase the data carrying capacity of a single fiber, but even WDM is reaching its limits. Accordingly, space division multiplexing (SDM) may be used to increase the data capacity of a communication network. SDM involves dividing communication traffic across optical propagating modes having different lateral spatial intensity and/or phase profiles. In some embodiments, SDM involves transmission of optical data signal streams over a bundling of optical fibers, i.e., an optical fiber cable. In other embodiments, the SDM involves transmission of optical data streams via different spatial optical propagating modes of a multimode optical fiber or a multi-core optical fiber. In some such SDM systems, relatively orthogonal optical propagating modes with different lateral spatial light intensity and/or phase profiles may support different SDM channels. A subset of multi-mode transmission is few-mode transmission, where a small number of relatively orthogonal optical propagation modes carry streams of optical data signals. A multicore optical fiber contains a number of separate optical waveguide cores. In some embodiments, the separate optical waveguide cores of a multicore optical fiber may carry different streams of optical data signals. In an SDM system, the use of an optical fiber cable, a multimode optical fiber, or a multicore optical fiber may increaste the potential transmission bandwidth over that of single mode optical fibers.

Over long haul optical communication networks, the optical signal may need to be optically amplified. Such optical amplification may be accomplished using an optical amplifier. Doped optical fiber amplifiers (DFAs) are optical amplifiers that use a rare-earth doped optical fiber as a gain medium to amplify an optical signal. The signal to be amplified and a pump laser are multiplexed into the doped optical fiber, and the optical signal is amplified through its interaction with the dopant atoms. The most common example is the erbium doped fiber amplifier (EDFA), where the optical core and/or optical cladding of a silica optical fiber is doped with trivalent erbium atoms and can be efficiently pumped, e.g., with a laser or other light source, at a wavelength of 980 nm or 1,480 nm, and may exhibit gain in the S, C and/or L optical telecommunications bands, e.g., at wavelengths near the 1,550 nm wavelength region.

With the use of SDM, there is a need to for an optical amplifier for a transmission system that may amplify light propagating in different spatial propagation modes and/or different optical waveguide cores, e.g., with reduced cost, volume, and/or complexity. Some current optical amplifiers may use individual optical amplifiers for light propagating in each of the spatial propagation modes and/or optical waveguide cores, which is typically not cost effective. Some of the embodiments described below may reduce the number of components required by using the multi-core optical amplifier fiber in a two-pass configuration, e.g., to build, a two stage optical fiber amplifier. By using a rare-earth doped optical fiber with multiple optical waveguide cores, the number of components required and hence the cost, volume and complexity may be reduced. More specifically, by using the multicore rare-earth doped optical fiber in a two-pass configuration, a two stage optical fiber amplifier may be implemented.

FIG. 1 illustrates an embodiment of a two-stage optical amplifier using a multicore rare-earth doped optical fiber. The optical amplifier 100 may include a 3 dimensional (3D) optical waveguide coupler 105, a multicore rare-earth doped optical fiber 110, a reflector 115, a pump laser 120, a pump coupler or mirror 125, and collimating and/or focusing optics 130. The optical amplifier 100 may receive an input light signal from an input SDM fiber 150 and transmit an output and amplified light signal to an output optical fiber 155.

Herein, a 3D optical waveguide coupler is an all-optical coupler having multiple optical waveguide cores embedded in an optical cladding, wherein the optical waveguide cores connect first and second faces of the 3D optical waveguide coupler. In a 3D optical waveguide coupler, the lateral spatial arrangement of, at least, two of the optical waveguide cores varies between the first and second faces.

The 3D optical waveguide coupler may receive the light signal on input SDM channels and map and direct these input channels to specific SDM channels on the multicore rare-earth doped optical fiber 110 in a one-to-one manner. For example, optical signals on individual optical propagating modes may be coupled to corresponding optical propagating modes by the 3D optical waveguide coupler. Similarly, the 3D optical waveguide coupler may be configured to couple light guided by individual optical cores of an input multicore optical fiber to corresponding individual optical cores of an output multi-core optical fiber. Indeed, the optical cores of such input and output multicore optical fibers may have different lateral spatial arrangements. Further, the 3D optical waveguide coupler may receive specific channels from the multicore rare-earth doped optical fiber 110 after amplification to map and direct these output channels to the output SDM fiber 150. The 3D optical waveguide coupler may be configured to handle various types of input SDM fibers 150. For example the input SDM fiber 150 may be a multicore fiber, a bundle of individual single mode fibers (SMFs), a bundle of multimode fibers (MMFs), a fiber ribbon, a single MMF, a single few mode fiber (FMF), or any other SDM type of input. Likewise, the 3D optical waveguide coupler may be configured to handle various types of output SDM optical fibers 155. For example the output SDM optical fiber 155 may be a multicore optical fiber, a multimode optical fiber, a bundle of individual single mode fibers (SMFs), e.g., an optical fiber cable, a bundle of multimode optical fibers (MMFs), a fiber ribbon, a single MMF, a single few mode fiber (FMF), or any other SDM type of output. Further, the input SDM optical fiber 150 and the output SDM fiber 150 may be different types of SDM optical fibers or optical fiber cables.

For example, the input SDM optical fiber may be a multicore fiber with 3 optical cores each carrying one SDM channel of light signals. The 3D optical waveguide coupler may map each of the 3 SDM channels to corresponding single cores in the multicore rare-earth doped optical fiber 110. If the input SDM optical fiber is a MMF that carries multiple channels using different optical propagation modes, then the 3D optical waveguide coupler may separate each of these different SDM channels and map each such SDM channel to a specific corresponding optical core in the multicore rare-earth doped optical fiber 110. While a 3D optical waveguide coupler is described herein, other types of optical couplers capable of coupling the input/output SDM optical fibers to the multicore rare-earth doped optical fiber may also be used.

Typically, each optical core in the multicore rare-earth doped optical fiber 110 will be a single mode optical core, but some of the optical cores may also be multimode optical cores. In such a situation, if the input SDM optical fiber 150 includes a MMF that is compatible with a multimode optical core in the multicore rare-earth doped optical fiber 110, the 3D optical waveguide coupler may map multiple or even all of the SDM optical propagating modes from the input MFF into a single optical core in the multicore rare-earth doped optical fiber 100. Accordingly, the 3D optical waveguide coupler 105 may be configured to interface various types input and output SDM channels with the multicore rare-earth doped optical fiber 110. Specifically, the 3D optical waveguide coupler will be configured to interface the specific inputs and output with the multicore rare-earth doped optical fiber 110.

The multicore rare-earth doped optical fiber 110 may include a number of rare-earth doped optical cores and/or a rare-earth doped optical cladding. A first end of the multicore rare-earth doped optical fiber 110 optically end-interfaces with the 3D optical waveguide coupler 105 which transmits input channels to specific optical cores of the multicore rare-earth doped optical fiber 110 allocated to a first stage of the optical amplifier 100. Further, the 3D optical waveguide coupler 105 transmits amplified channels from cores of the multicore rare-earth doped optical fiber 110 allocated to a second stage of the optical amplifier 100 to the output SDM fiber 155. A second end of the multicore rare-earth doped optical fiber 110 interacts with the pump laser 120, pump mirror 125, reflector 115, and optics 130 as further described below.

The number of optical cores of the multicore rare-earth doped optical fiber 110 may be chosen based upon the core size, fiber size, cross talk requirements, number of desired different SDM channels, etc. Each of the optical cores may be doped with dopant elements that create an optical gain media for use with a pumping laser. Erbium is a commonly used dopant for doped fibers, but any other dopant may be used, but other know rare-earth dopants for optical amplifiers may also or alternatively be used, e.g., Ytterbium or Praseodymium. A common multicore optical fiber may include 7 cores.

Figure 2:
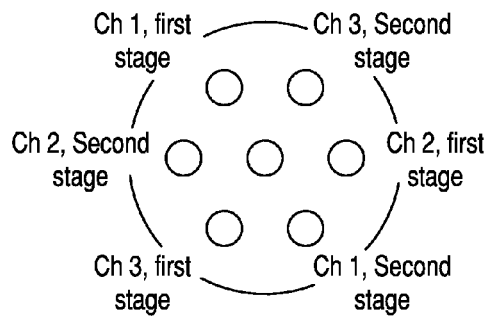
FIG. 2 illustrates an example layout of the optical waveguide cores in a multicore rare-earth doped optical fiber, e.g., the optical amplifier fiber of FIG. 1.

FIG. 2 illustrates an example lateral arrangement of the optical cores of a multicore rare-earth doped optical fiber with 7 optical cores. The lateral arrangement shows a center optical core surrounded by 6 additional optical cores in a hexagonal configuration. Because an even number of cores may be used for the two stage optical amplifier 100, the center core may or may not be used to carry and amplify an SDM channel, as the center core is the core most subject to crosstalk with the other cores. Further, as shown, in some embodiments, alternating cores may be assigned to the two different stages of the double-pass optical amplifier. This may minimize crosstalk as the nearest adjacent cores will be carrying channels propagating in the opposite direction in such an embodiment. Accordingly, it may be beneficial to allocate the cores to the two different stages in an alternating manner to minimize crosstalk. In other embodiments, it may be beneficial to keep channels in each stage near one another in order to ensure similar channel and amplification characteristics, if a variation in these characteristics is found across the cores of the multicore rare-earth doped optical fiber 110.

In the embodiment above, the center core of the fiber is unused. In other embodiments, the center fiber may be used to carry a calibration signal in order to measure the characteristics of the multicore rare-earth doped optical fiber 110. Also, the center core may be pumped by the pump laser 120 to pump the multicore rare-earth doped optical fiber 110. Other uses of the unallocated core may be apparent based upon the teachings contained herein.

The multicore rare-earth doped optical fiber 110 at its second end may transmit the light of the SDM channels from the optical cores allocated to the first amplifier stage into free space towards the focusing and/or collimating optics 130 and the reflector 115. The reflector 115 and the optics 130 may reflect and direct the light of the SDM channels from the optical cores in the first stage of the optical amplifier 100 back to the optical cores in the second stage of the optical amplifier, i.e., the same set of optical cores or a different set of optical cores. Further, the reflector 115 and/or the optics 130 may apply gain equalization and filtering of the received light. The optics 130 and the reflector 115 may be separate devices or elements of an integrated device. The optics 130 and the reflector 115 may optically interconnect the first stage of the optical amplifier 200 to the second stage.

In some embodiments the reflector 115 may be a two-dimensional (2D) array of separately operable optical reflectors. The reflector may include may be an array of micro-electro-mechanical system (MEMS) actuated mirrors or an array of liquid crystal on semiconductor (LCOS) reflectors and/or a polarization analyzer. In such embodiments, the individual reflectors of the 2D array may be controllable, e.g., by an electronic controller, to amplitude and/or phase modulate light that is received from the nearby end of the rare-earth doped optical fiber 110 so that said light is appropriately end-coupled back into the rare-earth doped optical fiber 110. For example, the array of reflectors may cause light of the initial pass to be reflected to a different set of optical cores of the rare-earth doped optical fiber 110 for the return pass therethrough. In addition, said individually controllable reflectors may be controllable to amplitude equalize said received light, e.g., so that light from different SDM channels receives about the same amplification or a preselected amplification profile in the optical amplifier 100.

The pump laser or pump light source 120 may produce pumping light that is pumped into the multicore rare-earth doped optical fiber 110, e.g., using a pump mirror 125. The pump mirror 125 may be dichoic mirror or any other mirror or optical element that may allow light of the SDM channels to pass therethrough while reflecting the pump light.

The pump light may be coupled to pump the optical cores and/or the optical cladding of the multicore rare-earth doped optical fiber 110. A cladding pumping arrangement is shown, where the laser pump 120 may be coupled into the cladding of the fiber using a pump mirror 125. The use of cladding pumping may be efficient when the laser pump 120 is efficiently shared by multiple optical cores. Alternatively, the laser pump 120 could be pumped into each optical core, but at the expense of increased complexity. The pumping laser light from the pump laser or pump light source 120 excites the dopant atoms in the multicore rare-earth doped optical fiber 110, which then may amplify the optical signal in the SDM channel being guide by one or more of the optical cores.

Figure 3:
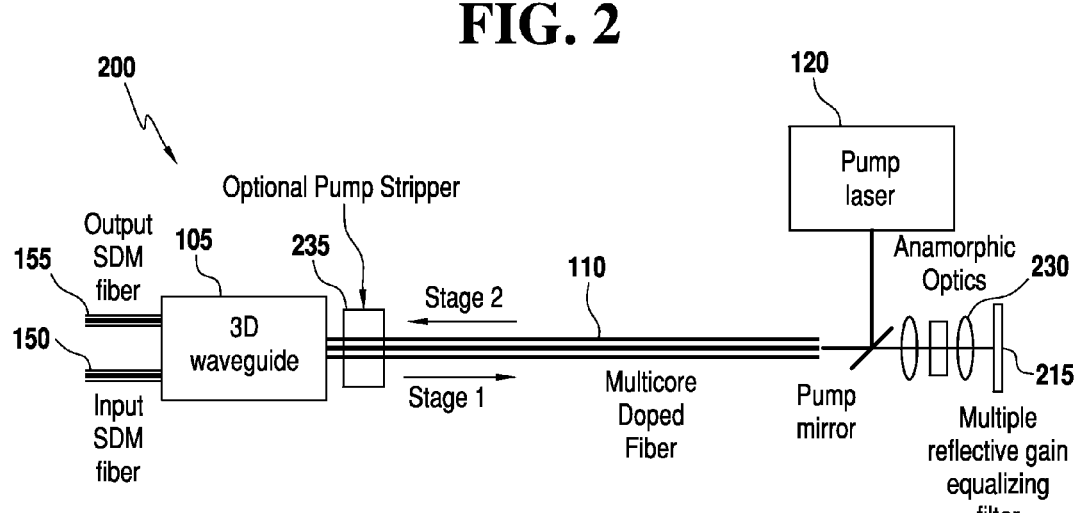
FIG. 3 illustrates another embodiment of a two-stage optical amplifier using a multicore rare-earth doped optical amplifier fiber.

FIG. 3 illustrates another embodiment of a two-stage optical fiber amplifier using a multicore rare-earth doped optical fiber. Various elements in FIG. 3 are the same as those in FIG. 1 and have the same reference number. The optical amplifier 300 of this embodiment includes anamorphic optics 230, a reflector 215 that provides reflective gain equalization, and a pump stripper 235.

The anamorphic optics 230 may provide additional functionality like optical isolation and/or channel wise spectral equalization of the SDM channels and/or overall channel attenuation. The reflector 215 may provide gain equalization and/or optical filtering or may also be a wavelength selective switch that filters and shapes the optical channels. The pump stripper 235 may reflect part of the pump light in the cladding and/or optical cores back towards the second end of the multicore rare-earth doped optical fiber 110 and or out of said optical fiber 110 thereby decreasing the amount of noise light in the optical amplifier 100. Also, the pump stripper 235 may prevent pumping laser light from propagating to the 3D optical waveguide coupler 105 and possibly to the input SDM optical fiber 150 and/or the output SDM optical fiber 155.

In the embodiments described above, the pump laser or light source 120 is shown as pumping light into the second end of the multicore rare-earth doped optical fiber 110. The pump laser or light source 120 may alternatively pump laser light into the multicore rare-earth doped optical fiber 110 via the 3D optical waveguide coupler 105. An external pumping lightsource, e.g., a laser or a light-emitting diode (LED), may provide pump light to an input of the 3D optical waveguide coupler 105 so that the 3D optical waveguide coupler 105 then directs the pump light to the optical cladding and/or the optical cores of the multicore rare-earth doped optical fiber 110. Also, the pump laser or light source 120 may be an integral part of the 3D optical waveguide coupler 105. In such situations the pump stripper 235 could be located near the second end of the multicore rare-earth doped optical fiber 110 in order to provide the most benefit of reflecting pumping laser light back into the multicore rare-earth doped optical fiber 110.

Figure 4:
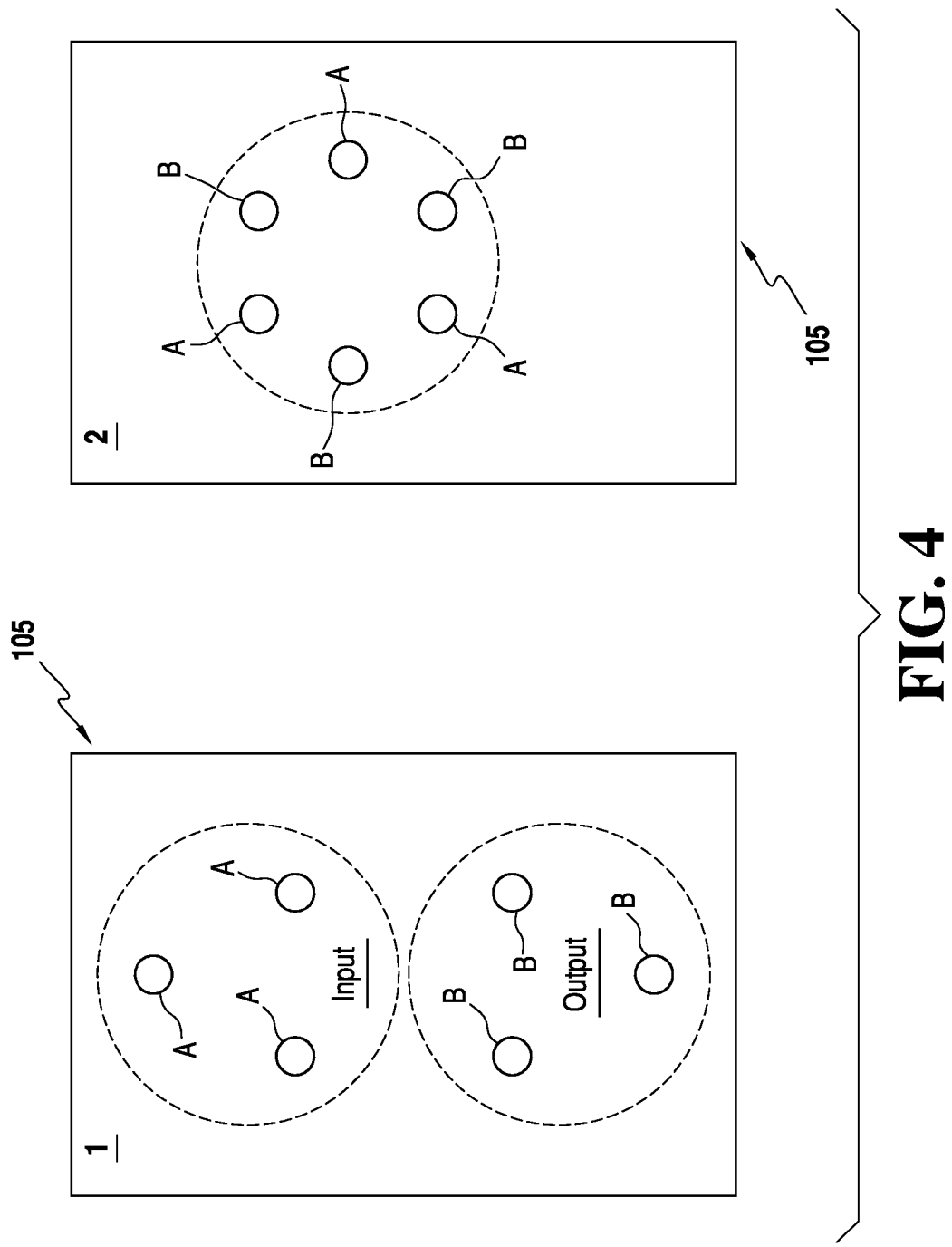
FIG. 4 illustrates a flowchart describing the operation of the optical amplifiers of FIGS. 2 and 3.

FIG. 4 illustrates a flowchart describing the operation of the optical amplifiers of FIGS. 2 and 3. The method 400 may begin at 405. The 3D optical waveguide coupler 105 may receive input SDM signal 410 from an input SDM fiber 150. The 3D optical waveguide coupler 105 may couple and propagate 415 the SDM channels in the input SDM signal to specific cores in the multicore rare-earth doped optical fiber 110 associated with the first stage of the optical amplifier 200, 300. The cores in the multicore rare-earth doped optical fiber 110 for each stage of the optical amplifier 200, 300 may be chosen to spatially alternate. A pump laser of source 120 produces pump light 420 that is transmitted into the multicore rare-earth doped optical fiber 110. The pump light may be pumped into the optical cladding and/or the optical cores of the multicore rare-earth doped optical fiber 110. A pump mirror may reflect and/or couple 425 the pump light into the multicore rare-earth doped optical fiber 110. The pump light excites rare-earth dopants 430 in the multicore rare-earth doped optical fiber 100. When the optical signal in the SDM channels guided by one of the optical cores interacts with the excited dopant atomss, the optical signal is amplified. The input SDM channels enter the first stage of the optical amplifier 200, 300, are amplified, and then exit the multicore rare-earth doped optical fiber 110. Optics 130, 230 and a reflector 115, 215 may reflect and direct 435 the amplified channels from the first stage of the optical amplifier 200, 200 back into the second stage thereof. The second stage then further amplifies the optical signals 440 of the SDM channels and outputs them to the 3D optical waveguide coupler. The 3D optical waveguide coupler 105 may then propagate the SDM channels 445 from the optical amplifier 200, 300 into the output SDM fiber 155. Further, a pump stripper 235 may reflect pump light back into multicore rare-earth doped optical fiber 110. This may improve the efficiency of the optical amplifier 200, 300. Further, in another embodiment, the pump laser may pump laser light into the multicore rare-earth doped optical fiber 110 via the 3D optical waveguide coupler 110. The method then ends at 455.

Figure 5:
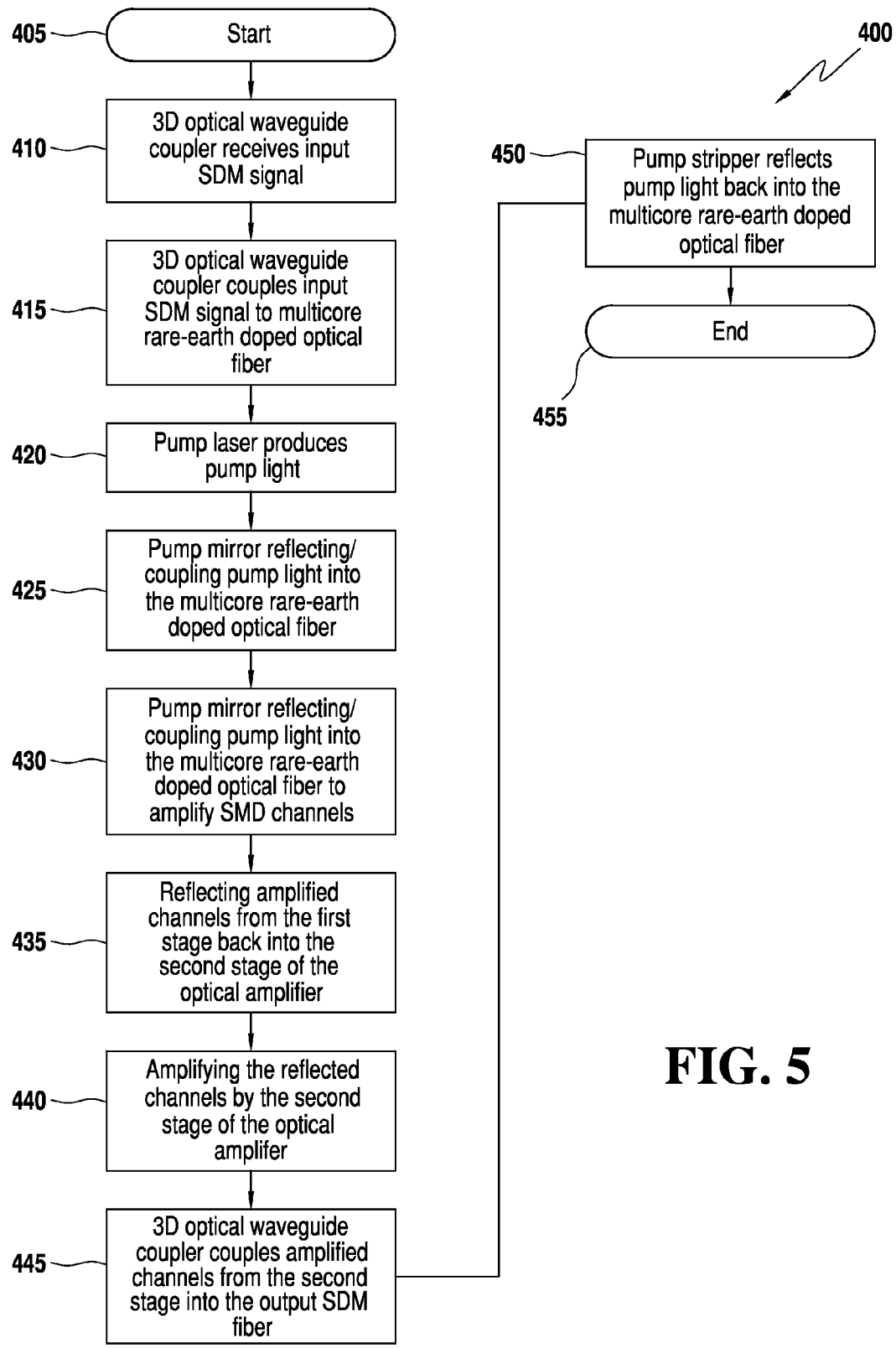
FIG. 5 illustrates patterns of optical waveguide cores on faces of one embodiment of a 3D optical waveguide coupler, e.g., an embodiment of the 3D optical waveguide couplers of FIGS. 1 and 3.

FIG. 5 illustrates an example of a 3D optical waveguide coupler, e.g., for embodiments of the optical amplifiers 100, 200 of FIGS. 1 and 3 in which input and output optical fibers or optical fiber cables have 3 optical cores.

FIG. 5 shows patterns formed by the optical waveguide cores A, B of the 3D optical waveguide coupler on face 1 and face 2 thereof. At face 1, the 3D optical waveguide coupler is configured to couple the optical waveguide cores A to a first optical fiber or optical fiber cable whose end face is facing and adjacent to the circular input area on the face 1. At the face 1, the 3D optical waveguide coupler is configured to couple the optical waveguide cores B to a second optical fiber or optical fiber cable whose end face is facing and adjacent to the circular output area of the face 1. In particular, the ends of the optical waveguide cores A are located in the circular input area, which is indicated as a dashed circle, and the optical waveguide cores B are located in the circular output area, which is indicated by a dashed circle. The circular input and output areas are not overlapping so that the two sets of optical waveguide cores, i.e., A and B, can end couple to the end faces of different optical fibers or optical fiber cables at the face 1. At a region of the face 2, i.e., indicated by a dashed circle, the 3D optical waveguide coupler is configured to couple both the optical waveguide cores A and the optical waveguide cores B to an end face of the same optical fiber, e.g., the rare-earth doped multicore optical amplifier fiber 110 of FIGS. 1 and 3. Thus, the different patterns formed by the optical waveguide cores A, B at the face 1 and the face 1, enable the single a 3D optical waveguide coupler to couple on face 1 to separate optical fibers or optical fiber cables and to couple on face 2 to the same single optical fiber. In various methods described and/or recited in this application, various steps of methods may be performed in a sequential manner, a parallel manner, or in a partially parallel manner.

Various embodiments of the optical amplifiers and the optical communication systems with optical amplifier(s), which are described herein, may include additional conventional optical components. The additional conventional optical components may include, e.g., optical isolator(s) and/or optical gain flattening filter(s), which remove or alter wavelength dependencies of transmission properties. These additional optical components may be placed in the embodiments of optical amplifiers and/or the embodiments of all-optical transmission lines in manners that would be easily understood by persons of ordinary skill in the art in light of teachings of this application. Such conventional optical components may be deployed in a manner similar to the deployment of such optical components in optical amplifiers and/or all-optical transmission lines.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. An apparatus comprising:
   an optical amplifier, further comprising:
   a multicore rare-earth doped optical fiber with a plurality of optical cores therein;
   an optical coupler capable of coupling light from an end of a first optical fiber or optical first fiber cable directly into a first end face of the multicore rare-earth doped optical fiber and being capable of coupling light from the first end face of the multicore rare-earth doped optical fiber into an end of a second optical fiber or second optical fiber cable; and
   an optical reflector configured to receive light from a second end face of the multicore rare-earth doped optical fiber and to redirect a portion of the received light back into the second end face of the multicore rare-earth doped optical fiber,
wherein the optical amplifier is configured to amplify a plurality of light signals received from the first optical fiber or optical first fiber cable.

2. The apparatus of claim 1, wherein the plurality of optical cores comprise a first set of the optical cores and a different second set of the optical cores; and
wherein the optical amplifier is configured such that the first set of optical cores guides light received from the optical coupler and such that the second set of optical cores guides light received from the optical reflector.

3. The apparatus of claim 1, wherein the optical coupler is configured to direct light from the first optical fiber or first optical fiber cable to a first set of optical cores of the multicore rare-earth doped optical fiber and is configured to direct light from a different second set of optical cores of the multicore rare-earth doped optical fiber into the second optical fiber or second optical fiber cable.

4. The apparatus of claim 1, wherein the optical coupler is a 3D optical waveguide coupler.

5. The apparatus of claim 4, wherein the 3D optical waveguide coupler has disjoint first and second sets of optical waveguide cores end-coupled to the multicore rare-earth doped optical fiber at a first face of the 3D optical waveguide coupler, a first face of the 3D optical waveguide coupler being configured to end-couple the first set of optical waveguide cores to the first optical fiber or first optical fiber cable and to end-couple the second set of optical waveguide cores to the second optical fiber or second optical fiber cable.

6. The apparatus of claim 4, wherein the 3D optical waveguide coupler has disjoint first and second sets of optical waveguide cores end-coupled to the multicore rare-earth doped optical fiber at a first face of the 3D optical waveguide coupler, ends of the first set of optical waveguide cores and the second set of optical waveguide cores being located in respective first and second circular regions on a second face of the 3D optical waveguide coupler, the first circular region being separated from the second circular region.

7. The apparatus of claim 1, further comprising a pump laser coupled to the multimode rare-earth doped optical fiber to deliver pump light to the multicore rare-earth doped optical fiber.

8. The apparatus of claim 1, further comprising a wavelength selective mirror configured to couple pump light into the multicore rare-earth doped optical fiber.

9. The apparatus of claim 1, wherein the reflector includes a 2D array of MEMS actuated reflectors or a 2D array of liquid crystal on semiconductor elements.

10. The apparatus of claim 1, wherein the reflector is a wavelength selective switch.

11. The apparatus of claim 1, wherein pump laser is coupled into the cladding of the multicore rare-earth doped optical fiber.

12. The apparatus of claim 1, further comprising optics between the multicore rare-earth doped optical fiber and the reflector, wherein the optics are configured to provide one of optical isolation, channel wise spectral equalization, and overall channel attenuation.

13. The apparatus of claim 1, further comprising:
a first span of optical fiber or optical fiber cable coupled to the optical coupler; and
a second span of optical fiber or optical fiber cable coupled to the optical coupler;
wherein the optical amplifier is configured to amplify signals propagating between the first span and the second span.

14. The apparatus of claim 1, wherein the first optical fiber or optical first fiber cable is a space division multiplexed (SDM) optical fiber, and the second optical fiber or optical first fiber cable is a SDM optical fiber.

15. The apparatus of claim 1, wherein the optical amplifier is configured to amplify a first plurality of light signals propagating in the multicore rare-earth doped optical fiber, and to amplify a second plurality of light signals propagating in the opposite direction of the first plurality of light signals in the multicore rare-earth doped optical fiber cable.

* * * * *